United States Patent [19]

Solie et al.

[11] 3,938,798
[45] Feb. 17, 1976

[54] ADJUSTABLE WORK SUPPORT

[75] Inventors: James C. Solie; Samuel B. McClocklin, both of Owatonna, Minn.

[73] Assignee: Owatonna Tool Company, Owatonna, Minn.

[22] Filed: Apr. 23, 1975

[21] Appl. No.: 570,614

[52] U.S. Cl. .................. 269/20; 188/67; 248/411; 269/296; 269/310
[51] Int. Cl.² .................... G25B 11/00; B23Q 3/10
[58] Field of Search ......... 269/20, 27, 30, 289, 309, 269/310, 296; 188/67, 129; 248/411, 412, 402

[56] References Cited
UNITED STATES PATENTS

| | | | |
|---|---|---|---|
| 2,984,212 | 5/1961 | Hicks et al. | 188/67 |
| 3,382,955 | 5/1968 | Deyerling | 188/129 |
| 3,421,750 | 1/1969 | Tridgell | 269/20 |
| 3,559,980 | 2/1971 | Terai et al. | 269/296 |
| 3,729,185 | 4/1973 | Roeske | 269/20 |

Primary Examiner—Harold D. Whitehead
Assistant Examiner—Robert C. Watson
Attorney, Agent, or Firm—Wegner, Stellman, McCord, Wiles & Wood

[57] ABSTRACT

An adjustable work support having a work supporting plunger adjustable to a position for support of a workpiece and having two sets of locking pins with one set being movable with respect to the other along with the work supporting plunger and selectively operable means for exerting a horizontal force against the sides of the two series of pins to provide frictional engaging forces between locking pins to resist the vertical force of the load of the workpiece against the adjustable work support.

10 Claims, 4 Drawing Figures

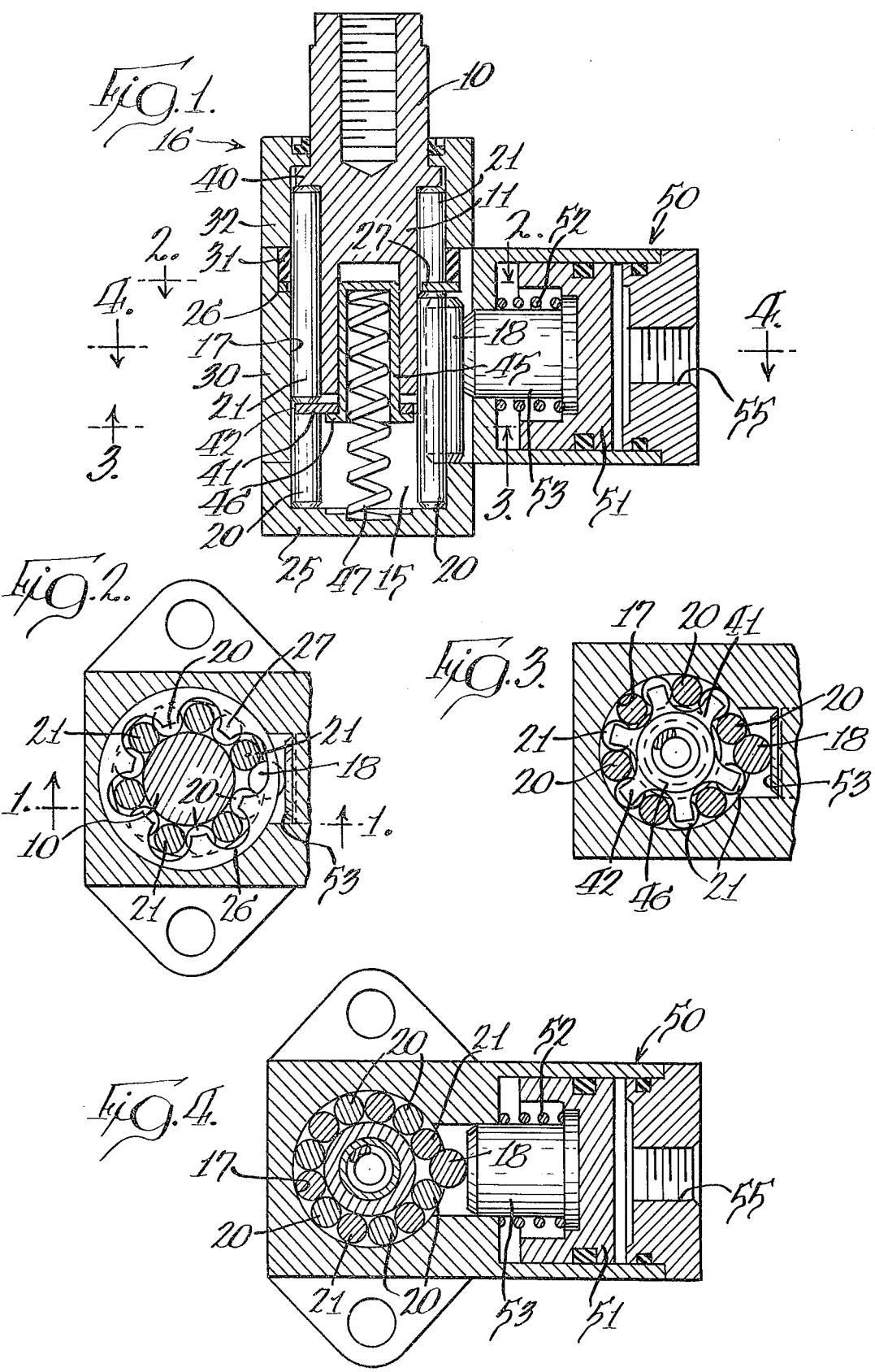

ADJUSTABLE WORK SUPPORT

BACKGROUND OF THE INVENTION

This invention pertains to an adjustable work support which is automatically self-adjusting to a supporting position beneath a workpiece and which may be held firmly in adjusted position under substantial load force of the workpiece.

Adjustable work supports are known in the prior art. Such supports have had an adjustable work-supporting plunger which may automatically move to an adjusted position and which is held in such position by the application of force applied either mechanically or hydraulically. The application of hydraulically applied force includes application to a compressive sleeve surrounding a stem of a work-supporting plunger, as shown in U.S. Pat. No. 3,729,185. Another type of structure is as shown in Tridgell U.S. Pat. No. 3,421,750 wherein a hydraulically-actuated piston applies force to two sets of interleaved flat plates with one set being stationary and the other set having plates alternating with plates of the first set and being movable with the work-supporting plunger. When the plunger moves to a position required for support of a workpiece, the hydraulically operated piston causes compressive engagement between the interleaved plates to hold the plunger in adjusted position.

The use of a wedging action to hold an adjustable work support in position is shown in Cleveland U.S. Pat. No. RE. 23,732.

SUMMARY

An objective of the invention disclosed herein is to provide an adjustable work support which may be economically constructed of relatively simple parts and which has increased load capacity whereby a workpiece may be held in position without inadvertent movement of the work support and possible resulting deflection of the workpiece.

In carrying out the invention, the adjustable work support disclosed herein has a casing with a cylindrical open-ended chamber and an adjustable work-supporting plunger extending therefrom. A cylindrical stem of the plunger is movable in the chamber and two series of elongate pins are positioned between the stem and the chamber wall, with one set movable with the stem and the other set held stationary in the casing, whereby the two sets of pins move relative to each other as the work-supporting plunger moves relative to the casing and, upon the application of a horizontal force to certain of said pins, all of the pins are brought into frictional engagement with each other along their lengths to firmly hold the work-supporting plunger in adjusted position.

The adjustable work support, as defined in the preceding paragraph, has the one set of pins movable with the work-supporting plunger mounted between a shoulder on the stem of the plunger and an annular pin retainer at the lower end of the stem which is yieldably held in position by a spring which also acts to normally urge the work-supporting plunger outwardly of the casing.

A further feature of the invention resides in the mounting of the second set of pins stationarily in the casing by the lower ends thereof engaging the lower wall of the casing chamber and there being a second annular pin retainer engaging the upper ends of the second set of the pins and yieldably held in position by a yieldable spacer mounted in the casing. The pins have flat ends and are of the same length within very close tolerance and the parts engaging therewith are also flat, whereby all of the pins of the two sets are fully effective in holding the work-supporting plunger in a work position beneath a workpiece.

BRIEF DESCRIPTION OF THE DRAWING

FIG. 1 is a central vertical section of the adjustable work support;

FIG. 2 is a section, taken generally along the line 2—2 in FIG. 1;

FIG. 3 is a fragmentary section, taken generally along the line 3—3 in FIG. 1; and FIG. 4 is a section, taken generally along the line 4—4 in FIG. 1.

DESCRIPTION OF THE PREFERRED EMBODIMENT

The adjustable work support has a work-supporting plunger 10 with a cylindrical stem 11 movable within a cylindrical open-ended chamber 15 in a casing, indicated generally at 16.

An annular space exists between the cylindrical stem 11 and a wall 17 of the chamber and this space is filled by a driving pin 18 and two sets of elongate, round locking pins, with the locking pins of a first set being identified at 20 and the locking pins of a second set being identified at 21. These pins are ground to the same length within very close tolerance and with flat ends and to a length less than the height of the chamber 15. The pins 20 and 21 of the two sets alternate with each other and the pins of the set 20 are held generally stationary within the chamber 15 by having their lower flat ends in engagement with a base 25 of the casing 16 and their upper flat ends engaged by an annular pin retainer 26 having spaced, inwardly-extending prongs 27. A prong 27 overlies each of the pins 20, as shown in FIG. 2. A central part 30 of the casing has an annular recess receiving the outer periphery of the pin retainer 26 and a rubber washer 31 is positioned in the recess above the pin retainer and held in position by a top part 32 of the casing whereby the pin retainer 26 is yieldably held in the position shown in FIG. 1.

The pins 21 of the second set move with the work-supporting plunger 10 and have their flat upper ends engaged with the underside of a shoulder 40 on the stem 11 and their lower ends engaged by an annular pin retainer 41 having a series of spaced-apart, outwardly-extending prongs 42 engaging the lower flat surfaces of the pins 21. The pin retainer 41 is yieldably held against the bottom end of pins 21 by a spring retainer 45 extending into a recess in the lower end of the stem 11 and having an outwardly-turned flange 46 engaging the underside of the pin retainer 41. A spring 47 acts between the spring retainer 45 and the casing base 25 to urge the work-supporting plunger 10 outwardly of the casing 16. The spring retainer 45 is loosely fitted within the opening of the stem 11 whereby the pin retainer 41 is yieldably held in position through the engagement thereof by the flange 46 of the spring retainer. Two of the inwardly-extending prongs 27 of the annular pin retainer 26 and also two of the outwardly-extending prongs 42 of the annular pin retainer 41 are at an increased spacing from each other because of the increased spacing between a pair of pins of the first and second sets caused by the location of the driving pin 18 between two of the pins.

The work-supporting plunger 10 is shown fully extended in FIG. 1. In use, a workpiece placed upon supports including one or more of the adjustable work supports disclosed herein results in lowering of the work-supporting plunger 10 to a supporting position which is permitted by the loose engagement between the sets of pins 20 and 21 and by their length which is less than the height of the chamber 15. In lowering of the work-supporting plunger 10, the second set of pins 21 moves downwardly relative to the first set of pins 20, with full lowering of the work-supporting plunger 10 bringing the second set of pins 21 down to a level only slightly above the level of the first set of pins 20 whereby there is line contact between the two sets of pins for substantially their entire length.

The actual supporting position can be at the position shown in FIG. 1 down to the fully depressed position described immediately above. When the position is obtained, a horizontal force is applied to the two sets of pins to bring them into tight contact with resulting frictional forces which, in effect, interlock the pins and function to hold the work support in adjusted position by the first set of pins 20 being firmly against the base 25 of the casing and the second set of pins 21 having their upper ends firmly against the shoulder 40. This horizontal force is provided by a fluid cylinder, indicated generally at 50, having a movable piston 51 normally urged to a retracted position toward the right, as viewed in FIG. 1, by a spring 52 surrounding a stem 53 movable with the piston 51. Application of fluid under pressure to the piston 51 through a port 55 results in moving the piston toward the left, as viewed in FIG. 1, against the action of the spring 52 to have the stem 53 push against the driving pin 18 which is positioned between a pin 20 of the first set of pins and a pin 21 of the second set of pins. This forces the two sets of pins into tight engagement with each other, with their retention by the chamber wall 17 whereby the line contact along their length results in strong frictional forces to resist the vertical force of a load of a workpiece acting against the work-supporting plunger 10. Upon release of the pressure acting against the piston 51, the spring 52 acts to move the stem 53 toward the right, as viewed in FIG. 1, to relieve the force against the driving pin 18 whereby the horizontal force acting on the two sets of pins is released. The pins of the two sets are free for movement with respect to each other, whereby the spring 47 urges the work-supporting plunger 10 and the second set of pins 21 upwardly to the inactive position shown in FIG. 1.

With the two sets of pins ground to the same length with very close tolerances and with the ends thereof being flat as well as accurate flatness of the pin retainers 26 and 41 and the shoulder 40 on the stem 11, there is an assurance that the lower ends of the first set of pins 20 bear fully against the base 25 of the casing and that the upper ends of the second set of pins 21 firmly engage the underside of the shoulder 40 to have all of the pins acting to resist a vertical force resulting from the load of a workpiece on the work-supporting plunger 10.

We claim:

1. An adjustable work support comprising a casing with a cylindrical open-ended chamber, a plunger having a cylindrical stem movable lengthwise in said chamber and an end outside said casing for work-supporting engagement, said chamber having a diameter greater than said stem to provide a space therebetween, a series of round locking pins in said space in side-to-side contact, every other pin movable with the stem and the remaining pins held against movement with the stem, a driving pin positioned between two of said locking pins, and means for exerting a force on said driving pin to force said two locking pins apart and exert a compressive force on said locking pins one against the other to hold the stem in adjusted position.

2. An adjustable work support as defined in claim 1 wherein said locking pins have a length substantially less than the height of said chamber and an annular pin retainer mounted to said casing at a location to engage and hold said remaining pins against movement with said stem.

3. An adjustable work support as defined in claim 2 and including a rubber spacer held in position by said casing and engaging said annular pin retainer to yieldably urge said annular pin retainer and said remaining pins toward the bottom of said chamber.

4. An adjustable work support as defined in claim 2 including a second annular pin retainer movable with said stem and engageable with said every other pin to cause the latter pins to move with the stem.

5. An adjustable work support as defined in claim 4 including a spring urging said stem outwardly of the casing, a spring retainer carried by said stem for said spring, and said spring retainer engaging said second annular pin retainer to yieldably hold said every other locking pin in position to move with the stem.

6. An adjustable work support as defined in claim 4 wherein the two of said annular pin retainers each have laterally-extending pin engaging prongs spaced apart to engage alternate ones of said series of pins.

7. An adjustable work support having a casing with an open-ended cylindrical chamber, a work-supporting plunger extending out from the casing and with a stem movable lengthwise within said chamber to various adjusted positions, said chamber having a diameter greater than said stem to have a chamber wall at a distance from the stem, a first series of stationary pins and a second series of movable pins disposed alternately one to the other between the chamber wall and the stem, means movable with the stem for causing said second series of pins to move with the stem, means associated with the casing for holding the first series of pins in position against the bottom of said chamber, said two series of pins having a length less than the height of the chamber and all being at approximately the same level when the stem is fully depressed in said chamber, and selectively operable means for urging said two series of pins tightly against each other and the chamber wall to hold the work-supporting plunger against movement under load.

8. An adjustable work support as defined in claim 7 wherein the means for causing the first series of pins to move with the stem includes a shoulder adjacent the upper end of the stem and an annular pin retainer with outwardly-extending spaced prongs engaging the lower ends of said first series of pins, a spring urging said stem outwardly of said casing, and means interconnecting said spring and annular pin retainer to floatingly retain said annular pin retainer in engagement with said stem for movement therewith.

9. An adjustable work support as defined in claim 8 wherein the means associated with the casing includes a second annular pin retainer with inwardly-extending spaced prongs engaging the tops of the first series of pins, an annular recess in said chamber wall to movably receive the outer periphery of said second pin retainer and a rubber spacer in said recess above the second pin retainer to yieldably hold said second pin retainer in position.

10. An adjustable work support as defined in claim 9 wherein all of said pins are of the same length, the ends of the pins and said retainer prongs being flat to assure firm seating of the first series of pins against the bottom of the chamber and the second series of pins against said stem shoulder.

\* \* \* \* \*